United States Patent
Naito

(10) Patent No.: US 7,681,614 B2
(45) Date of Patent: Mar. 23, 2010

(54) RUN FLAT SUPPORT BODY FOR PNEUMATIC TIRE

(75) Inventor: Mitsuru Naito, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 503 days.

(21) Appl. No.: 11/658,706

(22) PCT Filed: Aug. 26, 2005

(86) PCT No.: PCT/JP2005/015508

§ 371 (c)(1), (2), (4) Date: Jan. 29, 2007

(87) PCT Pub. No.: WO2006/022366

PCT Pub. Date: Mar. 2, 2006

(65) Prior Publication Data

US 2009/0188599 A1    Jul. 30, 2009

(30) Foreign Application Priority Data

Aug. 27, 2004  (JP) .............................. 2004-248737

(51) Int. Cl.
*B60C 17/00* (2006.01)
*B60C 17/04* (2006.01)

(52) U.S. Cl. ........................ 152/516; 152/458; 152/520

(58) Field of Classification Search ................. 152/458, 152/516, 520
See application file for complete search history.

(56) References Cited

U.S. PATENT DOCUMENTS 6,463,976 B1    10/2002    Glinz et al.

FOREIGN PATENT DOCUMENTS

| JP | 2001-519279 | 10/2001 |
| JP | 2004-82795 | 3/2004 |
| JP | 2004-98882 | 4/2004 |

*Primary Examiner*—Justin Fischer
(74) *Attorney, Agent, or Firm*—Greer, Burns & Crain, Ltd.

(57) ABSTRACT

A run flat support body for a pneumatic tire, including an annular shell and elastic rings, where the elastic rings are composed of a composite elastic material made by compounding reinforcement fillers with an elastic material so as to provide anisotropy to an effect of reinforcement thereof. Additionally, the compressive rigidity of the elastic rings in a radial direction of the tire is made larger than that of unreinforced elastic rings in the radial direction, and the bending rigidity of the elastic rings in an axial direction of the tire is made substantially equal to that of the unreinforced elastic rings in the axial direction. Preferably, the elastic rings include a layered body formed by alternately laminating layers of a composite elastic material in which short fibers are aligned in a circumferential direction and layers of a composite elastic material in which short fibers are aligned in the axial direction.

6 Claims, 2 Drawing Sheets

RUN FLAT SUPPORT BODY FOR PNEUMATIC TIRE

BACKGROUND OF THE INVENTION

1. Field of the Invention

The present invention relates to a run flat support body for a pneumatic tire. Particularly, the present invention relates to a run flat support body for a pneumatic tire, which achieves a good balance between run flat durability of the run flat support body to be inserted inside the pneumatic tire and workability for mounting the run flat support body on a rim (hereinafter sometimes referred to as "mounting").

2. Background Art

As measures enabling a vehicle to make an emergency running to a repair shop such as a gas station when a pneumatic tire of the vehicle is punctured while the vehicle is running, numerous proposals have been made, in each of which a core is inserted as a run flat support body in a hollow part of the pneumatic tire mounted on a rim of a wheel.

Among the proposals, there is a run flat support body, which is formed of an annular shell having left and right bifurcated leg parts on a cross section in a width direction of the tire, and which is formed in a manner where elastic rings are attached respectively onto the both leg parts. The run flat support body has an advantage that a conventional wheel can be used as it is without making any substantial modifications to a rim structure of the wheel. However, for the run flat support body formed as described above, it is required to compose the elastic rings supporting of a material having high rigidity so as to secure durability of the run flat support body during run flat driving.

For this reason, in Patent Document 1, it is proposed that the durability of the run flat support body is improved by covering a periphery of the elastic rings with a fiber reinforcing layer. However, if the run flat support body has a structure in which simply the elastic rings are covered with the fiber reinforced layer, the rigidity of the elastic rings becomes too high. Because of that, a problem occurs in which workability for mounting at a time of mounting a run flat support body onto the rim of the wheel becomes extremely poor. That is, when mounting the run flat support body onto the rim of the wheel, the mounting is performed by bending the elastic rings in an axial direction of the tire by applying a large lateral force to the run flat support body. Accordingly, when the bending rigidity of the elastic rings becomes too high as described above, a problem arises in which a difficulty occurs in the mounting operation.

Patent Document 1: Japanese patent application Kokai publication No. 2004-98882.

DISCLOSURE OF THE INVENTION

An object of the present invention is to solve the above-described problem and is to provide a run flat support body for a pneumatic tire which achieves a good balance between favorable workability for mounting and excellent run flat durability.

In order to achieve the above-described object, a run flat support body for a pneumatic tire of the present invention is provided with a special structure including an annular shell and elastic rings. The annular shell has an outer peripheral side which serves as a support surface for supporting an inner surface of the tire and an inner peripheral side which straddle in a form of a bifurcation. The elastic rings are attached respectively to both leg parts of the annular shell and the annular shell is supported on a rim of a wheel with the elastic rings. In the run flat support body, the elastic rings are composed of a composite elastic material made by compounding reinforcement fillers with an elastic material in a way that anisotropy is provided to a reinforcement effect thereof. Accordingly, compressive rigidity of the elastic rings in a radial direction of the tire is made to be larger than that of unreinforced elastic rings in the tire radial direction, the unreinforced elastic rings being composed of a single elastic material in which the reinforcement fillers are not compounded, and also bending rigidity of the elastic rings in an axial direction of the tire is made to be substantially equal to that of unreinforced elastic rings in the tire axial direction, the unreinforced elastic rings being composed of a single elastic material in which the reinforcement fillers are not compounded.

In the run flat support body for a pneumatic tire of the present invention, the elastic rings are composed of the composite elastic material in which the reinforcement fillers are compounded with the elastic material in a way that anisotropy is provided to the reinforcement effect. With the anisotropy of the reinforcement effect, the compressive rigidity of the elastic rings in the tire radial direction is made to be larger than that of unreinforced elastic rings in the tire radial direction, the unreinforced elastic rings being composed of a single elastic material in which the reinforcement fillers are not compounded, and on the other hand, the bending rigidity of the elastic rings in the tire axial direction is made to be substantially equal to that of unreinforced elastic rings in the tire axial direction, the unreinforced elastic rings being composed of a single elastic material in which the reinforcement fillers are not compounded. Thus, the run flat durability is secured by increasing the compressive rigidity of the elastic rings in the tire radial direction. At the same time, because an increase in the bending rigidity of the elastic rings in the tire axial direction is suppressed, the workability for mounting at the time of mounting the tire onto the rim can be favorably secured.

BEST EMBODIMENT MODE FOR CARRYING OUT THE INVENTION

A configuration of the present invention is described below in detail with reference to the accompanying drawings.

Figure 1:
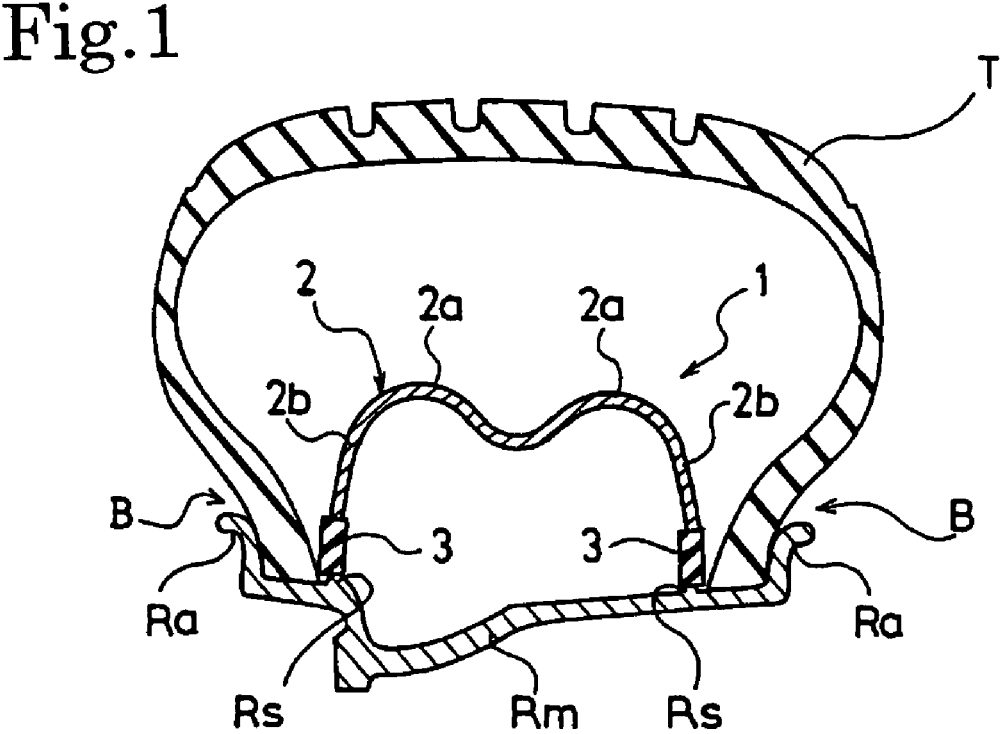
FIG. 1 is a meridian sectional view of substantial parts of a tire/wheel assembly to which a run flat support body for a pneumatic tire of an embodiment of the present invention is attached.

In FIG. 1, a tire/wheel assembly (wheel) is composed in a way that a pneumatic tire T attaches bead portions B and B thereof onto a rim Rm of a wheel. A run flat support body 1 according to an embodiment of the present invention is inserted into an inside of the pneumatic tire T. The run flat support body 1 is composed of an annular shell 2, and elastic rings 3 and 3 attached to both left and right leg parts thereof.

When making a run flat running because the pneumatic tire T was punctured, the elastic rings 3 and 3 of the run flat support body 1 absorb impacts and vibrations which the annular shell 2 receives from the pneumatic tire T, and the elastic rings 3 and 3 also play a role to stably support the run flat support body 1 by preventing the run flat support body 1 from sliding with respect to rim seats Rs.

The annular shell 2 is composed of a highly rigid structural material such as metal, and has two convex curved surfaces 2*a* and 2*a* (right and left) on an outer peripheral side on a lateral cross section in the width direction of the tire. The annular shell 2 is also formed of an annular body which makes an inner peripheral side thereof straddle in a form of a bifurcation, and also the elastic rings 3 and 3 are respectively attached onto bifurcated leg parts 2*b* and 2*b* of the annular shell 2. The annular shell 2 is supported on the rim Rm of the wheel with the elastic rings 3 and 3 interposed therebetween, and sandwiches the bead portions B and B of the pneumatic tire T, respectively with rim flanges Ra and Ra. In the illustrated example shown in the drawing, two convex curved surfaces 2*a* and 2*a* (right and left) are provided on the outer peripheral side. The number thereof is, however, not particularly limited, may be one, or alternatively may be three or more.

Although the run flat support body 1 with the above-described configuration is spaced from an inner wall surface of the pneumatic tire T during normal driving in which the pneumatic tire T is not punctured, the run flat support body 1 is adapted to support a flat pneumatic tire T from the inside thereof during run flat driving in which the pneumatic tire is punctured.

Figure 2:
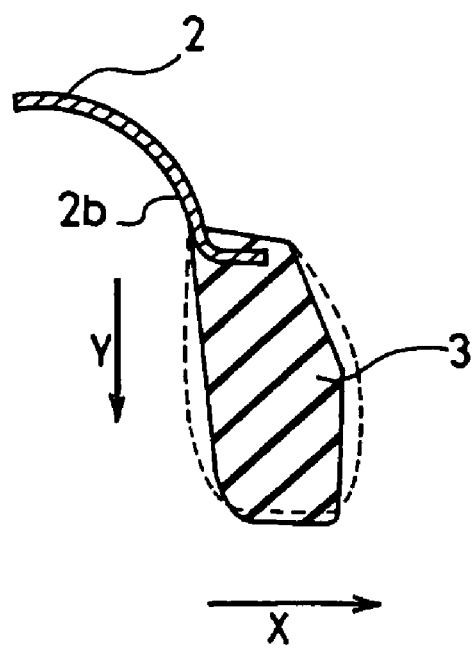
FIG. 2 is an enlarged sectional view of leg parts of the run flat support body shown in FIG. 1.

In a case of the run flat driving in which the tire T is punctured, the elastic rings 3 and 3 successively undergo repeated compressive deformations, as shown by a dotted line in FIG. 2, caused by a load in the Y direction, which is applied thereto from a road surface via the tire T. Accordingly, there is a problem that a durability of the elastic rings 3 and 3 themselves is gradually deteriorated. For this reason, in order to secure an excellent run flat durability of the pneumatic tire, it is necessary to enhance a compressive rigidity of the elastic rings 3 and 3 in a tire radial direction (Y direction).

However, in order to enhance the compressive rigidity of the elastic rings 3 and 3 in the tire radial direction, if the elastic rings 3 and 3 are simply composed of a material having high compressive rigidity, a bending rigidity of the elastic rings 3 and 3 in a tire axial direction is concurrently increased. When the bending rigidity of the elastic rings 3 and 3 in the tire axial direction becomes too high, the following problem occurs. At the time of a mounting operation, the run flat support body 1 is inserted inside the pneumatic tire T in a way that the run flat support body 1 is mounted onto the rim Rm. When a lateral force is applied to the elastic rings 3 of the run flat support body 1 along with the bead portions B of the tire T so as to cause the elastic rings 3 and the bead portions B to climb over the rim flanges Ra, a large resisting force in the X direction is generated in the elastic rings 3. For this reason, the lateral force to be applied thereto needs to be very large and, and a problem is thus occur, in which the mounting operation becomes extremely difficult.

In order to facilitate the operation for the climbing over of the rim flanges as much as possible, it is required to decrease the bending rigidity of the elastic rings 3 and 3 in the tire axial direction (X direction). However, if the elastic rings 3 and 3 are simply composed of a material having a smaller rigidity for facilitating the operability of the mounting, a high compressive rigidity in the tire radial direction cannot be obtained, and thus, the aforementioned run flat durability is decreased.

In the present invention, in order to achieve a good balance between the operability of the mounting and the run flat durability, which conflicting with each other as described above in handling the run flat support body 1, the elastic rings 3 and 3 are composed of a composite elastic material which is compounded with reinforcement fillers so as to produce an anisotropy as a reinforcement effect. In addition, the composite elastic material, which has anisotropic rigidity, is formed in a manner as follows. The composite elastic material makes the compressive rigidity of the elastic rings 3 and 3 in the tire radial direction larger than that of unreinforced elastic rings in the tire radial direction, the unreinforced elastic rings being formed of a single elastic body in which the reinforcement fillers are not compounded, while making the bending rigidity of the elastic rings 3 and 3 in the tire axial direction substantially equal to that of the unreinforced elastic rings in the tire axial direction, the unreinforced elastic rings being formed of the single elastic body in which the reinforcement fillers are not compounded. By the above formation, while the run flat durability thereof is secured by increasing the compressive rigidity of the elastic rings 3 and 3 in the tire radial direction and, the operability in the mounting is improved by suppressing an increase in the bending rigidity of the elastic rings 3 and 3 in the tire axial direction, thus securing a favorable mountability thereof.

Here, what is meant by that the bending rigidity of the elastic rings 3 and 3 in the tire axial direction is substantially equal to that of the unreinforced elastic rings in the tire axial direction, the unreinforced elastic rings being composed of a single elastic material in which the reinforcement fillers are not compounded is as follows. The bending rigidity of the elastic rings composed of the composite elastic material in the tire axial direction is preferably in a range of 1.0 to 1.5 times the bending rigidity of the elastic rings composed of a single elastic material in which the reinforcement fillers are not compounded, or more preferably in a range of 1.0 to 1.2 times the same. A change in a bending modulus of an elastic body in the tire axial direction accompanied with the compounding of the reinforcement fillers is made to be within the above-described range, and thus, the operability in the mounting operation is more firmly improved, and thus, the mountability thereof can be favorably secured.

In the present invention, as a method of providing the anisotropy in the composite elastic material, at first, a fibrous material having a high aspect ratio to be described later is used as the reinforcement fillers. At the same time, the reinforcement fillers need to be formed in an elastic material in a way that the longitudinal direction of the reinforcement fillers is aligned in one direction. Use of the composite elastic material in which the reinforcement fillers are aligned in the above-described manner makes it possible to increase the rigidity against a compressive load in a direction perpendicular to the direction in which the reinforcement fillers are aligned, while not so much increasing the rigidity against a bending load to the aligned direction. Accordingly, in the composite elastic material forming the elastic rings, in a case where the longitudinal direction of the reinforcement fillers is aligned in the tire axial direction, it is possible to increase the compressive rigidity in the tire radial direction and to suppress low an increase in the bending rigidity in the tire axial direction.

The compressive rigidity of the elastic rings in the tire radial direction is measured in conformity with JIS K7056 in both cases respectively where the elastic rings are composed of the composite elastic material or the single elastic material. The bending rigidity of the elastic rings in the tire axial direction is measured in conformity with JIS K7055 in both cases where the elastic rings are composed of the composite elastic material or the single elastic material.

In the present invention, as an elastic material forming the elastic rings, at least one selected from the group consisting of rubber, resin and composite materials of these, can be used. Among such materials, the rubber is particularly preferable. What can be preferably provided as the rubber is natural rubber, isoprene rubber, styrene-butadiene rubber, butadiene rubbers butyl rubber and the like.

Although the reinforcement fillers are not limited to any particular materials as long as they produce an anisotropy as a reinforcement effect, a fibrous material having a high aspect ratio is preferably used. For example, short fibers, long fibers, inorganic fillers having a high aspect ratio or a plate-like shape and the like can be enumerated. Among those, the short fibers are especially preferable. The length of the short fibers is preferably in the range of 1 to 6 mm. By use of the short fibers having the length in the above range, an orientation of the short fibers is improved so that the anisotropy of a fiber reinforced composite material is further improved.

For the short fibers, any one of organic short fibers and inorganic short fibers can be used. Although the organic short fibers are not limited to any particular materials, nylon, polyester, aramid, polyethylene, cellulose, polyvinyl alcohol, and the like can be preferably enumerated. In a case of the organic fibers, fibrillated short fibers are especially preferred. Furthermore, for the inorganic short fibers, metal fibers, carbon fibers, glass fibers and the like are preferably used.

Figure 3:
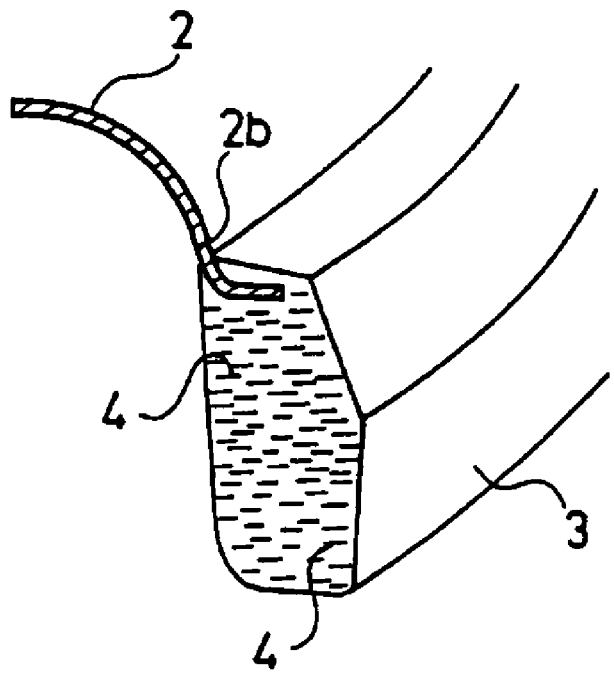
FIG. 3 is a sectional view showing an embodiment of elastic rings attached to the leg parts of the run flat support body for a pneumatic tire of the present invention.

FIG. 3 is a view showing one example of the elastic rings attached to the run flat support body 1 for a pneumatic tire of the present invention. The elastic rings 3 of the present embodiment is composed of a composite elastic material in which short fibers 4 are aligned in the tire axial direction as the reinforcement fillers in rubber. In this manner, by aligning the short fibers 4 in the tire axial direction, the bending rigidity of the elastic rings 3 in the tire axial direction is made to be substantially equal to that of rubber alone (a single elastic body) and an increase in the bending rigidity thereof is suppressed, and at the same time, the compressive rigidity in the tire radial direction is increased. As a result, it is possible to achieve a good balance between the securing of the favorable mountability and an excellent run flat durability.

Although there is no particular limitation to a method of manufacturing the elastic rings 3 in which the short fibers 4 are aligned in the tire axial direction, the following one may be adopted as an example. First, the short fibers 4, along with unvulcanized rubber in which the short fibers 4 are compounded, are extruded in a sheet form from an extruder, and then, single fibers are subjected to a shear force in a dice, whereby a rubber sheet can be obtained, in which the single fibers are aligned in a direction in which the rubber sheet is extrusion. The rubber sheet is cut off in a slender form at a predetermined width in a direction perpendicular to the direction of the extrusion. This string-like unvulcanized rubber thus formed is adhered to the leg parts 2b and 2b of the annular shell, and an outside thereof is covered with a mould and vulcanized, hence completing the manufacturing thereof.

Figure 4:
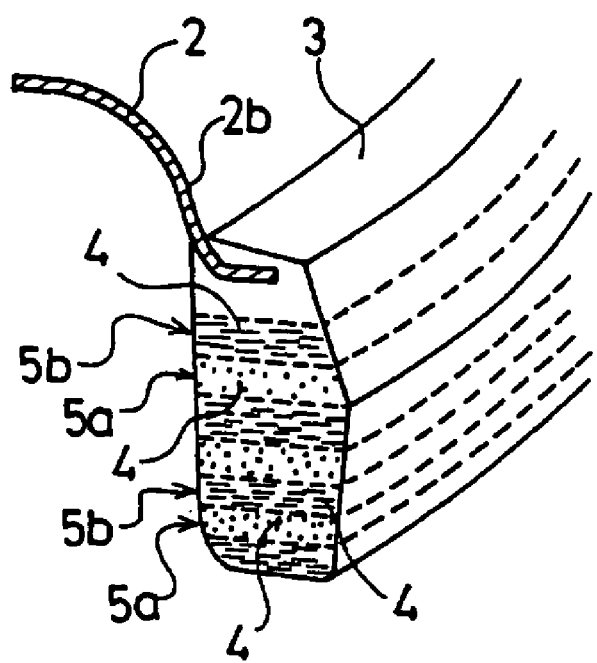
FIG. 4 is a sectional view showing another embodiment of elastic rings attached to the leg parts of the run flat support body for a pneumatic tire of the present invention.

FIG. 4 is a view showing another example of the elastic rings attached to the run flat support body for a pneumatic tire of the present invention. Each of elastic rings 3 and 3 of the present embodiment is formed in a layered body formed in a way that layers 5a and layers 5b are alternately layered. Each of the layers 5a is composed of a composite elastic material in which the short fibers 4 are aligned in the circumferential direction of the tire. Each of the layers 5b is composed of a composite elastic material in which the short fibers 4 are aligned in the tire axial direction. In the above manner, by forming the elastic rings 3 and 3 with the layered body formed of composite elastic material layers 5a, in which the short fibers 4 are aligned in the circumferential direction of the tire, and composite elastic material layers 5b, in which the short fibers 4 are aligned in the tire axial direction, as in the first embodiment, the bending rigidity of the elastic rings 3 in the tire axial direction is set in a range being substantially equal to that of a single elastic body, and at the same time, the compressive rigidity in the tire radial direction is increased. As a result, it is possible to achieve a good balance between the securing of favorable workability for mounting and the excellent run flat durability.

The elastic rings 3 formed in the layered body in which composite elastic material layers 5a in which the short fibers 4 are aligned in the circumferential direction of the tire and composite elastic material layers 5b in which the short fibers 4 are aligned in the tire axial direction are alternately layered are manufactured, for example, as follows. Slender pieces of unvulcanized rubber formed by cutting an unvulcanized rubber sheet off in a direction perpendicular to the direction of the extrusion and slender pieces of unvulcanized rubber formed by cutting the unvulcanized rubber sheet off in a direction parallel to the direction of the extrusion are alternately layered, the unvulcanized rubber sheet including the short fibers 4 aligned therein in the direction of the extrusion. Then, a layered body thus formed is attached to the leg parts 2b and 2b of the annular shell, and is vulcanized and molded by covering with a mould and vulcanized.

As described above, for the run flat support body for a pneumatic tire of the present invention, the elastic rings are made of the composite elastic material formed by compounding the reinforcement fillers with the elastic material in a way that an anisotropy is produced as an reinforcement effect and are attached respectively to both leg parts of the annular shell. Moreover, the elastic rings are formed in a way that the compressive rigidity thereof in the tire radial direction is to be larger than that of the elastic rings composed of a single elastic material, and the bending rigidity thereof in the tire axial direction is to be substantially equal to that of the elastic rings composed of a single elastic material. The run flat support body is thus mounted on the inner side of the pneumatic tire and assembled onto the wheel to thereby form a tire/wheel assembly, thus making it possible to achieve a good balance between the excellent run flat durability and the favorable mountability.

What is claimed is:

1. A run flat support body for a pneumatic tire, including an annular shell and elastic rings, the annular shell having its outer peripheral side which serves as a support surface for supporting an inner surface of the tire, the inner peripheral side of the annular shell, which straddles in a form of a bifurcation, the elastic rings being attached respectively to both leg parts of the annular shell, and the annular shell being supported on a rim of a wheel with the elastic rings, wherein:

the elastic rings are composed of a composite elastic material made by compounding reinforcement fillers with an elastic material so as to provide anisotropy to an effect of reinforcement thereof, compressive rigidity of the elastic rings in a radial direction of the tire is made larger than that of unreinforced elastic rings in the tire radial direction, which is composed of a single elastic material in which the reinforcement fillers are not compounded, bending rigidity of the elastic rings in an axial direction of the tire is made substantially equal to that of the unreinforced elastic rings in the tire axial direction, which is composed of the single elastic material in which the reinforcement fillers are not compounded, and the elastic rings are formed in a layered body formed by alternately laminating layers of a composite elastic material in which short fibers are aligned in a circumferential direction of the tire and layers of a composite elastic material in which short fibers are aligned in the tire axial direction.

2. The run flat support body for a pneumatic tire according to claim 1, wherein:

the bending rigidity of the elastic rings in the tire axial direction is set in a range of 1.0 to 1.5 times the bending rigidity of the elastic rings composed of the single elastic material in which the reinforcement fillers are not compounded.

3. The run flat support body for a pneumatic tire according to claim 1, wherein the reinforcement fillers are fibers of lengths between 1 mm and 6 mm.

4. A tire/wheel assembly which is attached to the inside of a pneumatic tire, comprising:

a run flat support body for the pneumatic tire, including an annular shell and elastic rings, the annular shell having its outer peripheral side which serves as a support surface for supporting an inner surface of the tire, the inner peripheral side of the annular shell, which straddles in a form of a bifurcation, the elastic rings being attached respectively to both leg parts of the annular shell, and the annular shell being supported on a rim of a wheel with the elastic rings, wherein the elastic rings are composed of a composite elastic material made by compounding reinforcement fillers with an elastic material so as to provide anisotropy to an effect of reinforcement thereof, wherein compressive rigidity of the elastic rings in a radial direction of the tire is made larger than that of unreinforced elastic rings in the tire radial direction, which is composed of a single elastic material in which the reinforcement fillers are not compounded, wherein bending rigidity of the elastic rings in an axial direction of the tire is made substantially equal to that of the unreinforced elastic rings in the tire axial direction, which is composed of the single elastic material in which the reinforcement fillers are not compounded, wherein the elastic rings are formed in a layered body formed by alternately laminating layers of a composite elastic material in which short fibers are aligned in a circumferential direction of the tire and layers of a composite elastic material in which short fibers are aligned in the tire axial direction, and wherein the run flat support body is mounted onto the rim of the wheel along with the tire.

5. The tire/wheel assembly according to claim 4, wherein:

the bending rigidity of the elastic rings in the tire axial direction is set in a range of 1.0 to 1.5 times the bending rigidity of the elastic rings composed of the single elastic material in which the reinforcement fillers are not compounded.

6. The tire/wheel assembly according to claim 4, wherein the reinforcement fillers are fibers of lengths between 1 mm and 6 mm.

* * * * *